United States Patent [19]
Breuer

[11] 3,891,507
[45] June 24, 1975

[54] ORGAN FUNCTION TEST CARDS

[75] Inventor: Charles Benedict Breuer, Pearl River, N.Y.

[73] Assignee: American Cyanamid Company, Stamford, Conn.

[22] Filed: May 30, 1974

[21] Appl. No.: 474,749

[52] U.S. Cl. ...... 195/103.5 R; 23/230 B; 23/253 TP
[51] Int. Cl. ............................................. C12k 1/04
[58] Field of Search ............ 195/103.5 R; 23/230 B, 23/253 TP

[56] References Cited
UNITED STATES PATENTS

| | | | |
|---|---|---|---|
| 3,552,929 | 1/1971 | Fields et al. | 23/253 TP |
| 3,783,105 | 1/1974 | Moyer et al. | 195/103.5 R |
| 3,806,422 | 4/1964 | Moyer et al. | 23/230 B |
| 3,810,739 | 5/1974 | Nussbaum | 23/253 TP |

*Primary Examiner*—A. Louis Monacell
*Assistant Examiner*—C. A. Fan
*Attorney, Agent, or Firm*—Jack W. Richards

[57] ABSTRACT

A combination of solid and dried diagnostic test indicators in the form of spot deposits are grouped on a diagnostic test card for purposes of profiling or monitoring a specific organ by way of the blood, or the like. Each test indicator is made up of a bibulous material impregnated with the dried residue of a chromogenic reagent system which changes color in response to the concentration of various biochemical and chemical constituents of blood, or the like, each reagent system indicative of the function of the same organ. Each test indicator contains all the reagent materials necessary for a particular diagnostic test needing only the addition of blood, or the like, to activate the dried reagents. Upon activation, color changes or intensities are read by comparison with color comparator controls on said test card specific for each test indicator. In this way, the combination of test indicators on any given organ function test card, provides an indication of the function and status of the particular organ for which the test card is intended, and thus, the state of the organ itself, in regard to biochemical and chemical parameters indicative of various pathological conditions.

6 Claims, 4 Drawing Figures

PATENTED JUN 24 1975                3,891,507

ORGAN FUNCTION TEST CARDS

BACKGROUND OF THE INVENTION

Dried reagent impregnated bibulous materials such as paper strips containing color changing reagents used to test body fluids for a biochemical or chemical component such as ketone bodies, urea content, calcium or magnesium content, cholinesterase activity, alkaline phosphatase or other components are known, for example, U.S. Pat. Nos. 3,212,855, 3,418,083, 3,597,321, 3,511,608, 3,232,710, 3,598,533 and 3,699,005. Also known are dried reagent impregnated paper strips for urinalysis containing a plurality of different color tests on the same strip to be used in conjunction with a separate color comparator control card. Such strips are being marketed by Ames Company, Elkhart, Dnd., under the trademark Multistix, U.S. Pat. No. 3,001,915 discloses a bibulous paper strip for testing biological fluids which comprises a bibulous paper strip having at least two test portions separately impregnated with a color changing reagent material capable of detecting biological fluid abnormality. the '915 patent is concerned with a combination diagnostic composition whereby two or more tests may be made on a biological fluid simultaneously, as disclosed, to simultaneously test urine for glucose, albumin, ketone bodies, pH, or any combination, using a single bibulous paper strip impregnated with the reagents necessary for the above tests.

U.S. Pat. No. 3,666,421 discloses an immunological or diagnostic test card containing one or more tests thereon in the form of solid, dried stable spot deposits made up of antigens, antiserum or antibodies which upon being moistened with a liquid to be tested are reconstituted to test reagents and then united to form a spot of reaction mixture. Other test cards are found disclosed in U.S. Pat. Nos. 3,770,572, 3,074,853 and 3,272,319. U.S. Pat. No. 3,663,374 discloses a single spot test on a test plate held between slides utilizing reagent systems for quantitating enzyme activity in blood. In the '374 patent, all necessary reagents for detecting, for example, creatine phosphokinase (CPK), along with CPK standards, are freeze-dried in pads or discs of absorbent material held between slides or plates. U.S. Pat. No. 3,783,105 discloses a test plate for assaying enzyme activity in body fluid similar to that in the '374 patent comprising a single test spot test wherein the rate of color development on reference spots containing pre-standardized increments of enzyme is compared directly with that on a test spot where the enzyme in the body fluid reacts. U.S. Pat. No. 3,791,933 is similar to both the '374 and '105 patents and relates to extensions and improvements thereon. The '933 patent also discloses a single spot test on a test plate for enzyme, substrate or metabolite determination from body fluids. In the '933 patent, enzyme measurement involves color development on enzyme test spots which is compared to color development on reference spots containing standardized amounts of enzymes and/or inhibitory agents. According to the '933 patent, for substrate or metabolite measurement, where measurement is dependent only on conversion of the compounds of interest, direct comparison between the color developed on the test spot and a color chart on the test plate calibrated in terms of concentration is used.

In contrast to the aforementioned patents, the present invention contemplates individual organ function test cards, each card containing a specific combination, or battery, of biochemical and chemical test, enzymatic and/or non-enzymatic, the combination of which is used to evaluate and determine the function of a specific organ, such as the liver, kidney, heart, pancreas, prostate, lungs, adrenal gland, thymus and pituitary, in regard to biochemical and chemical parameters indicative of various pathological conditions. The invention finds particular application in a doctor's office or small laboratory. By taking one sample of serum from a patient and performing a specific combination of spot tests thereon, the physician is able to tell in a matter of minutes organ dysfunction. If indicated, the physician can then order more quantitative, or additional, tests to be performed in a regular clinical laboratory for confirmation and follow-up of the spot tests. The nature of the organ function test cards of this invention lend themselves well to maintaining and following medical case histories. For example, with a series of organ function test cards maintained over a period of time, the function or changes in function of a particular organ for a particular patient can be readily and conveniently followed from year to year. In this way, early diagnosis or organ dysfunction is possible. None of the aforementioned patents are concerned with the present concept of grouping a combination of spot tests on a card, the test combination indicative of the function of a particular organ.

SUMMARY OF THE INVENTION

This invention is in the area of diagnostics. It is concerned with an organ function test card for the determination of organ function and organ status from a single sample of blood, or the like, i.e., serum or plasma, which comprises a combination of solid and dried diagnostic test indicators mounted on a test card, each of said test indicators made up of a bibulous carrier material containing therein the dried residue resulting from the impregnation thereof with a chromogenic reagent system capable of detecting by color change concentrations of various biochemical and chemical constituents of blood, serum or plasma exposed thereto, each test indicator determinative of the function of the same organ, and a color comparator control mounted on said card specific for each diagnostic test indicator thereon. The results of the combination of tests on a single test card can give an indication on such card of just how any malfunction of the organ has resulted in abnormal levels of blood constituents and what effect therapy has produced in returning levels of such constituents to normal. This invention is also concerned with a method for determining organ function and organ status using the organ function test card disclosed herein.

One aspect of this invention contemplates a diagnostic test card for the determination of organ function or status from the concentration of various biochemical and chemical constituents blood, serum or plasma which comprises a plurality of, at least two, solid and dried diagnostic test indicators mounted on said card, each of said test indicators comprising a bibulous carrier material impregnated with the dried residue of a chromogenic liquid reagent composition which changes color in response to the concentration of said constituents of said blood, serum or plasma when in contact therewith, each of said test indicators, in combination, indicative of the function or status of the same organ, and at least one color comparator control mounted on said card specific for each diagnostic test indicator thereon.

The invention provides on a single test card all the necessary reagents for performing diagnostic tests of the types described herein for organ function in the form of solid and dried spot deposits, each containing a predetermined amount of test reagent to yield optimal results, and positioned in close proximity to each other, which upon being moistened with blood, serum or plasma form a colored spot of reaction mixture. The invention can be used to profile or monitor a specific organ and provide an indication of its present state. For example, the invention deals with a heart function test card containing thereon a battery of spot tests which, in combination, can be used to determine heart function and status. It is known, for example, that changes in lactate dehydrogenase, creatine phosphokinase and α-hydroxybutyrate dehydrogenase levels in the blood can be indicative of heart function and thus heart status. The results of the combination of these tests on a single test card can give an indication on such a card of just how the heart is functioning and its present state, in regard to biochemical and chemical parameters indicative of various pathological conditions.

The organ function test card of the present invention can be of any desired dimension and configuration such as rectangular, triangular, square, circular, or the like, and can be made up of any material having sufficient rigidity to withstand handling with the capability of not adversely affecting the reagent systems thereon. The test card can be made up of transparent plastic, plastic film, fiber, cellulose, or the like, or any combination thereof such as a plastic-coated cellulose card or a fiber card with a removable transparent plastic overlay. The organ function test card may be enclosed in a protective outer package such as aluminum foil or a transparent plastic material and, the package closed by a heat seal or bonded with an adhesive around the peripheral margin.

The solid and dried diagnostic test indicators or spot tests mounted on the organ function test card comprise a bibulous carrier material which may be any bibulous material which can be impregnated with the reagent system desired and which does not adversely affect the reagent system impregnated therein. The bibulous material may be mounted on the organ function test card in any manner so long as it does not adversely affect the reagent system therein. Mounting may be done simply with an adhesive bond between the test card and the bibulous carrier material or more elaborate mountings may be employed such as the use of a mounting assembly employing a transparent plastic holder, a paper ring of reagent free paper, a paper disc impregnated with the dried reagent system and a base assembly. Also, with the proper material, mounting may be done by pressure without the aid of adhesives. For example, the bibulous material in the form of discs can be placed between release papers and pressed or imbedded into a card made up of a plastic film. Suitable adhesives include cellulose acetate, cellulose phthalate-acetate mixture, polyvinyl chloride, polyvinyl alcohol-acetate mixtures, and the like. the bibulous carrier material may be of any configuration such as circular, square, rectangular, triangular or the like, and it may be of any desired size. Suitable bibulous carrier materials include common cellulosic paper or more elaborate cellulosic materials such as cellulosic paper having diaphorase covalently bound to a hydrophilic, cross-linked, sulfited aldehyde or ketone polymer dispersed throughout the interstices thereof, as disclosed in U.S. Pat. application, Ser. No. 414,034, filed Nov. 8, 1973. The bibulous carrier material may comprise one sheet or layer containing the total reagent system or two or more sheets or layers each containing a part of the total reagent system needed for the particular test.

The reagent systems to be impregnated in the bibulous carrier material include both known and heretofore unknown biochemical and chemical reagent systems, enzymatic and/or non-enzymatic, which utilize color changing reagents and contain all necessary reagents for a particular test. Any reagent system capable of being impregnated satisfactorily onto or into a bibulous carrier material may be used. Representative enzymatic and non-enzymatic tests which may be impregnated in a bibulous carrier material and used as spot tests for inclusion on specific organ function test cards include: for the kidney, the test combination for, glutamic oxaloacetic transaminase, lactic dehydrogenase, cholinesterase, blood urea nitrogen, and creatine, for the liver, the test combination for, blood urea nitrogen, glutamic oxaloacetic transaminase, bilirubin, total protein, albumin, alkaline phosphatase and gamma glutamyl transpeptidase; for the heart, the test combination for, lactic dehydrogenase, glutamic oxalocetic transaminase, creatine phosphokinase and hydroxybutyrate dehydrogenase; for the pancreas, the test combination for, aldolase, glutamic oxaloacetic transaminase, amylase and lipase. Reagent systems have been impregnated in bibulous carrier materials and which may be placed on organ function test cards and used according to this invention include, for example, those reagent systems set forth in U.S. Pat. Nos. 2,987,450, 2,999,052, 3,001,915, 3,418,083, 3,585,001, 3,598,533, 3,663,374, 3,783,105 and 3,791,933.

It will be noted that some tests may be used in a different combination to test the function of more than one organ. However, it is to be stresssed that it is the particular and known combination of tests on a single card for a particular organ which is the essence of this invention, and it matters not that any particular test or tests appear on different organ function test cards. For example, serum creatine phosphokinase (CPK) activity is of value in the diagnosis of diseases of the skeletal and cardiac muscles. Elevated values are found in myocardial infarction and in progressive muscular disease in children with the Duchenne type of muscular dystrophy. Elevations of CPK have also been reported in hypothyroidism, in some patients with cerebrovascular disease, in certain pulmonary disorders, and in other disease status. Serum glutamic-oxaloacetic transaminase (SGOT) activity is clinically useful in recognizing a variety of conditions. Elevated SGOT values occur following damage to the liver or heart muscle cells. Myocardial infarction, hepatitis, infectious mononucleosis, and cirrhosis are some of the conditions that cause elevated SGOT values. Serum glutamic pyruvic transaminase (SGPT) is clinically significant in the diagnosis of hepatic disease. The SGPT levels reflect acute hepatic disease more specifically than serum glutamic oxaloacetic transaminase levels. Greatly elevated SGPT values occur in infectious or toxic hepatitis, infectious mononucleosis, and cirrhosis. The SGPT concentration is moderately elevated in obstructive jaundice, metastatic carcinoma, and hepatic congestion. Serum α-hydroxybutyrate dehydrogenase (HBD) activity is of value in the diagonsis of myocardial infarction. Elevated HBD values are more specific than either LDH or SGOT for myocardial infarction, and HBD activity remains elevated for longer periods after infarction. Serum lactate dehydrogenase (LDH) is elevated in many clinical conditions, e.g., myocardial infarction. Serum LDH activity is also increased in cirrhosis, hepatitis, and metastatic involvement of the liver. It is also elevated in cases of pulmonary embolism, megaloblastic anemia, progressive muscular dystrophy, and destructive renal diseases.

Other biochemical or chemical, enzymatic and/or non-enzymatic tests, appropriately grouped for determination of a specific organ's function, may also be used as spot tests for inclusion on specific organ function test cards, as this invention does not residue in any particular spot test but in the grouping of spot tests on an individual test card which are indicative, in combination, of an organ's function so that the particular organ can be monitored and a record of its function maintained on said card. The body fluids contemplated include blood, serum and plasma. However, the particular body fluid to be used to activate a particular dried reagent system may depend, of course, on the particular organ to be tested and upon the particular reagent system or spot test involved. The organs contemplated include the liver, heart, kidney, pancreas, prostate, lung, adrenal gland, thymus, pituitary, and any other organ the dysfunction of which can be detected by biochemical and chemical means indicative of pathological conditions.

The color comparator control on the organ function test card may represent the color one gets for low, normal or elevated test results, it may contain a graduated range of color comparisons, or it may be calibrated in terms of color concentration and test results with or without concentration scales or units. The color comparator controls are made up of paper, or the like, appropriately colored to represent the color one gets with each test, be it normal, high or low, or whatever.

Another aspect of this invention contemplates a method for the determination of organ function of status from the concentration of various biochemical and chemical constituents of blood, or the like, using the aforementioned organ function test card which comprises contacting each diagnostic test indicator on said card with blood, or the like, and comparing the color of each indicator with the corresponding color comparator control on said card for each indicator.

BRIEF DESCRIPTION OF THE DRAWING

Illustrative embodiments of the present invention will be explained with reference to the accompanying drawing in which.

DETAILED DESCRIPTION OF THE INVENTION

Figure 1:
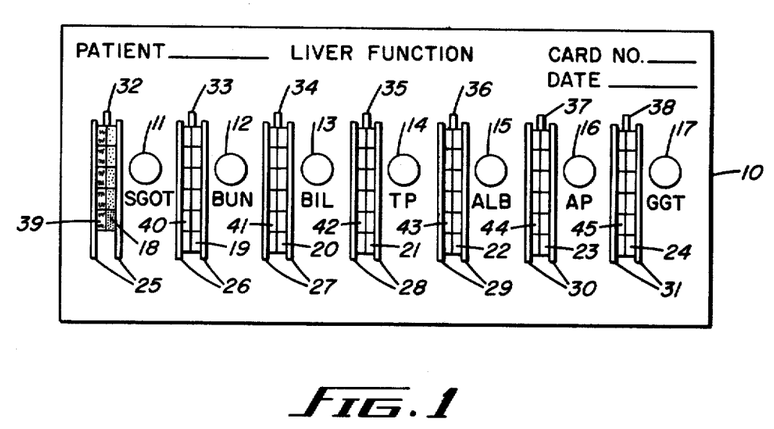
FIG. 1 is an embodiment of the present invention representing a liver function test card.

An organ function test card embodying the invention, that is, a liver function test card, is illustrated in FIG. 1, and comprises a liver test card 10 of appropriate material such as a plastic-coated fiber card. Liver test card 10 contains seven spot tests thereon, i.e., spot tests 11, 12, 13, 14, 15, 16 and 17, each spot test indicative of liver function. Each spot test 11-17 is made up of a bibulous carrier material such as cellulosic paper appropriately mounted on liver test card 10, and each bibulous carrier thereon is impregnated with the dried residue of a different color changing reagent material each containing all the reagents necessary for a particular liver test. Liver spot tests 11-17 each contain color changing reagent systems capable of detecting by color change concentrations of various constituents of serum indicative of liver function and, in combination, provide a means for determining, profiling or monitoring liver function, and thus the state of the liver itself, in regard to biochemical and chemical parameters indicative or various pathological conditions. Color comparator controls 18, 19, 20, 21, 22, 23 and 24 are each slidably mounted on liver test card 10 between tracks 25, 26, 27, 28, 29, 30 and 31, and each moves freely to and fro when a pulling or pushing motion is applied to tabs 32, 33, 34, 35, 36, 37 and 38. In FIG. 1, there is a corresponding color comparator control 18-24 for each spot test 11-17. Color comparator controls 18-24 are not standards, but are made up to represent a range of color shades representative of the color one gets for test results falling within specified ranges. Each spot test 11-17 has its own color comparator control characteristic for that particular test. The particular spot tests 11-17 shown in FIG. 1 are: 11, serum glutamic oxaloacetic transaminase (SGOT); 12, blood urea nitrogen (BUN); 13, bilirubin (BIL); 14, total protein (TP); 15, albumin (ALB); 16, alkaline phosphatase (AP); and 17, gamma glutamyl transpeptidase (GGT). All these tests are indicative of liver function, and in combination, provide liver function assessment and status. In FIG. 1, only color comparator control 18 has been drawn to represent a range of color shading and with a concentration scale 39. However, it is to be understood that each color comparator control 19-24 has its own range of color shading 40-45 and concentration scale in a manner similar to that for color comparator control 18.

Figure 2:
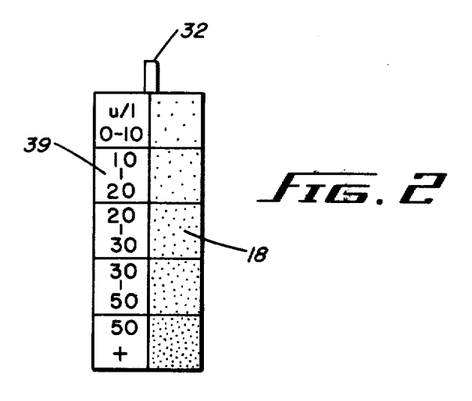
FIG. 2 is an enlargement of slide color comparator 18 for spot test 11 shown in FIG. 1.

FIG. 2 is an enlarged version of color comparator control 18 for spot test 11, more clearly showing the color comparisons and concentrations connected therewith.

With reference to FIG. 1, in use, a drop of the patient's serum is applied to each of spot tests 11-17. After a few minutes, the change and/or intensity of color in spot tests 11-17 is matched with its corresponding color comparator control 18-24 for a direct visual reading by aligning color comparator control 18-24 next to corresponding spot tests 11-17 with tabs 32-38. Based on the color response, the amount of blood urea nitrogen or other constituent (from the other spot tests) can be easily determined. Color intensity is proportional to the amount of constituent in the serum sample. The result of the combination of the liver tests gives an indication of the liver function and status, in regard to biochemical parameters indicative of various pathological conditions of the liver.

Figure 3:
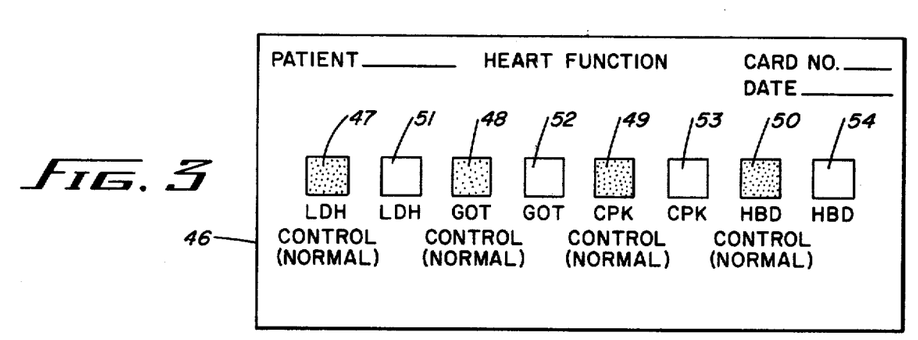
FIG. 3 is an embodiment of the present invention representing a heart function test card.

FIG. 3 represents another embodiment of the present invention, a heart function test card 46. In the embodiment of FIG. 3, the color comparator controls 18–24 of FIGS. 1 and 2 are replaced by color comparator control spots 47–50, each color spot colored to resemble a normal color, that is the color one gets when a drop of normal serum is placed on corresponding spot tests 51–54. In use, a drop of the patient's serum is placed on each spot test 51–54. After a few minutes the color of spot test 51–54 is compared with the color of the adjacent and corresponding normal color comparator control 47–50. If the colors match, the test is negative. If the color does not match, heart dysfunction may be present and further testing ought be carried out.

Figure 4:
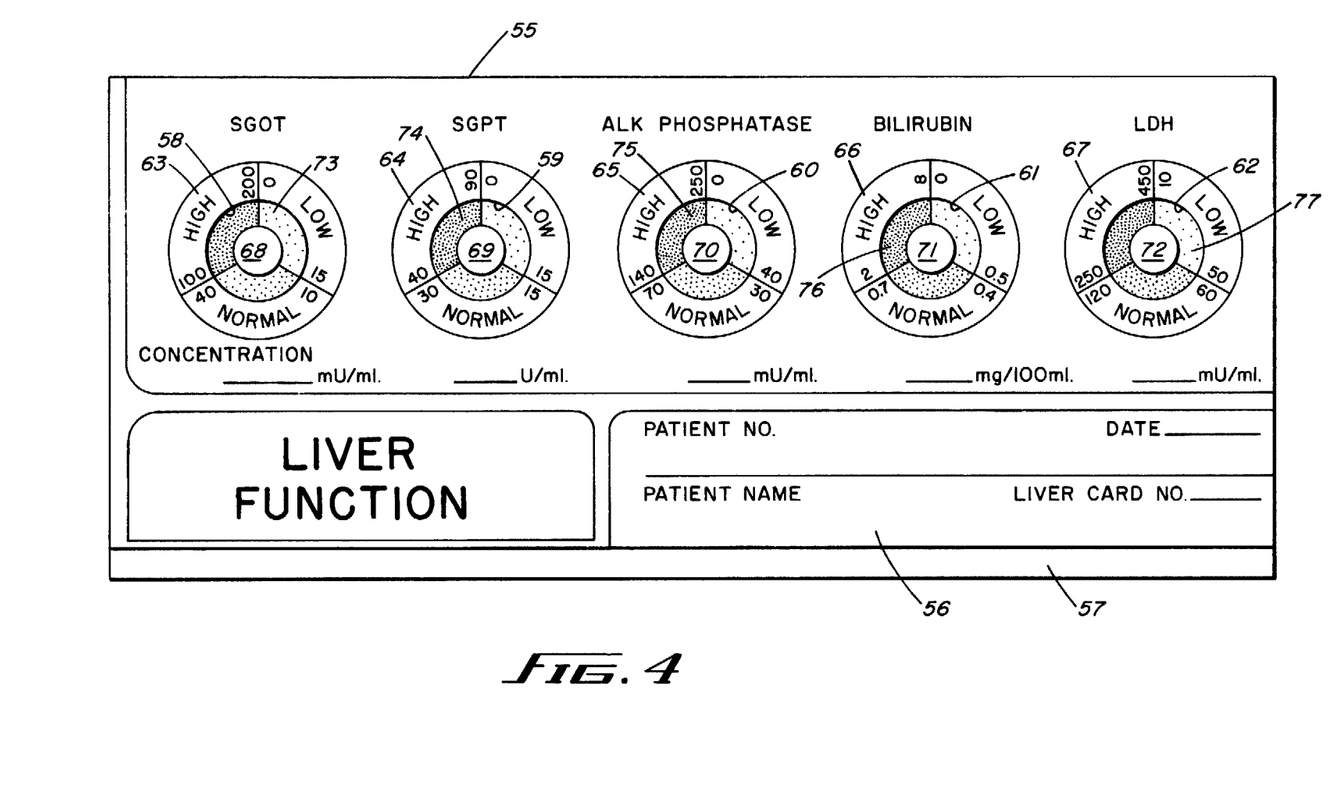
FIG. 4 is another embodiment of the present invention representing a liver function test card.

FIG. 4 represents another embodiment of the present invention, a liver function test card 55. In the embodiment shown in FIG. 4, liver function test card 55 is folded back under its self so that it contains two layers, upper layer 56 and lower 57. Upper layer 56 has five holes punched in it, the outer boundary of each hole being 58, 59, 60, 61 and 62. On upper layer 56, around the outer boundary 58, 59, 60, 61 and 62 of each hole, is a concentration range area 63, 64, 65, 66 and 67, with numerals in the units for each particular spot test thereon, to be described. Lower layer 57 has affixed thereto spot tests 68, 69, 70, 71 and 72 which are aligned in the center of each hole bounded by outer boundary 58, 59, 60, 61 and 62, and accessible there through. Spot tests 68–72 are also accessible from the underside of lower layer 57, for as will be pointed out, the serum is applied to spot tests 68–72 from the underside of the card, as drawn in FIG. 4. On lower layer 57, around the periphery of spot tests 68–72 and extending outwardly therefrom to outer boundary 58–62, are color comparator controls 73, 74, 75, 76 and 77 of graduating colors or intensities corresponding to the units found in concentration range area 63–67 on upper layer 56. With reference to FIG. 4, in use, test card 55 is turned over and a drop of serum is placed on the underside of each spot test 68–72. A better color reading is obtained, due to migration and other factors, if the serum is applied in this manner. Test card 55 is then turned back over, as drawn in FIG. 4, and after color development in spot tests 68–72, the intensity of the color in each spot test 68–72 is matched up with the color of the corresponding color comparator control 73–77 surrounding spot tests 68–72, and a concentration reading taken from the units in the corresponding concentration range area 63–67 on upper layer 56. The concentration can then be recorded in the space provided on upper layer 56 below each spot test.

Table I sets forth further information for the five tests shown in FIG. 4, and indicates the color range for each test thereon. Table I also sets for the three additional tests, and information thereon, which can be added to the test card shown in FIG. 4 to make up an eight test liver function test card.

The following examples will further illustrate specific organ function test cards with the spot tests involved and the chemistries to be included thereon.

TABLE I

Five and Eight Test Liver Function Test Card

| Test | Number Range | | | Units | Color Range |
| | Low | Normal | High | | |
| --- | --- | --- | --- | --- | --- |
| Five-Test Card: | | | | | |
| Bilirubin | 0–0.5 | 0.4–0.7 | 2–8 | mg./100 ml. | Pink - Dark Red |
| Alkaline Phosphatase | 0–40 | 30–70 | 140–250 | mU/ml. | Lavender - Purple |
| Lactic Dehydrogenase | 10–50 | 60–120 | 250–450 | mU/ml. | Pink - Dark Red |
| Serum Glutamic Oxaloacetic Transaminase | 0–15 | 10–40 | 100–200 | mU/ml. | Light yellow - Brown yellow |
| Serum Glutamic Pyruvic Transaminase | 0–15 | 15–30 | 40–90 | U/ml. | Pink - Dark Red |
| Eight-Test Card: | | | | | |
| Glucose | 40–80 | 85–110 | 200–400 | mg./100 ml. | Light Green - Dark Blue |
| Total Protein | 3–5 | 5–7 | 6–8 | G/100 ml. | Light Blue - Dark Blue |
| Albumin | 2–4 | 3–5 | 4–6 | G/100 ml. | Light Green - Dark Green |

EXAMPLE 1

Heart Function Test Card

This example illustrates a heart function test card containing four separate spot tests thereon which, in combination, are indicative of heart function and status. The spot tests included on this heart function card are two tests for lactate dehydrogenase (LDH), one test for creatine phosphokinase (CPK) and one test for serum glutamic oxaloacetic transaminase (SGOT).

1. Lactate Dehydrogenase Test and Bibulous Carrier Therefor

Details for this lactate dehydrogenase test, bibulous carrier materials which may be impregnated with all the necessary test reagents involved and the method for the preparation of the impregnated bibulous materials, are all set forth in U.S. Pat. application, No. 414,053, filed Nov. 8, 1973, which is incorporated herein by reference.

Briefly, this lactate dehydrogenase test comprises a bibulous carrier material (cellulosic paper) which has contained therein the dried residue resulting from the impregnation thereof with a tetrazolium salt, a chromatographic effect preventor, an anti-oxidant, diaphorase and a nocotinamide-adenine-dinuclotide-alkali lactate salt mixture. The following will serve to illustrate a specific embodiment thereof.

Commercially available cellulose paper 200 mm. square, 0.019–0.0205 in. thick, 245–255 g./m$^2$ in weight, having an absorbancy of 9–20 sec. using 0.1 ml. of water according to TAPPI test T432 and expanding less than 2.5% in cross-direction when wetted with water is saturated with a solution containing 0.19 part of 2-(p-iodophenyl)-3-(p-nitrophenyl)-5-phenyl-2H-tetrazolium chloride (INT), 0.03 part of polyoxyethylene (20) cetyl ether as wetting agent, and 0.50 part of polymethacrylic acid dissolved in 100 parts of water, pH 7.5. The above treated paper is dried under vacuum at room temperature (26°C.) in the dark and dipped in a second solution containing 1.0 part dilaurylthiodipropionate anti-oxidant and 100 part of hexane. This paper is again dried and dipped in a third solution containing 0.09 part of diaphorase, 20.0 parts of maltose and 0.54 part of the same wetting agent dissolved in 100 parts of 0.05M tris buffer, i.e., 2-amino-2-(hydromymethyl)-1,3-propane, diol pH 7.2. The multi-treated paper is dried and a fourth coating added, composed of 0.08 part of nicotinamide-adenine dinucleotide (NAD), 0.025 part of additional wetting agent and 0.84 part of lithium lactate in 100 parts of water, pH 8.8. The paper is again dried.

2. Lactate Dehydrogenase Test and Bibulous Carrier Therefor

Details for this lactate dehydrogenase test bibulous carrier materials which may be impregnated with all necessary test reagents involved and the method for the preparation of the impregnated bibulous materials, are all set forth in U.S. Pat. application, Ser. No. 414,034, filed Nov. 8, 1973, which is incorporated herein by reference.

Briefly, this lactate dehydrogenase test comprises a bibulous carrier material (cellulosic paper) having diaphorase covalently bound to a hydrophilic, cross-linked, sulfited aldehyde or ketone polymer dispersed throughout the interstices thereof which contains therein the dried residue resulting from the impregnation thereof with an alkali lactate salt, nicotinamide-adenine-dinucleotide and a tetrazolium salt. The following will serve to illustrate a specific embodiment thereof.

A. Solubilization of Polyacrolein

To a suitable reaction vessel fitted with stirrer, condenser, thermometer, nitrogen gas inlet and constant temperature bath are added 344 grams of sodium metabisulfite and 2400 ml. of distilled water. The pH of this solution is adjusted to 5.6 with 10M sodium hydroxide solution and 300 parts of finely divided polyacrolein are added. The reaction is allowed to continue under a nitrogen blanket at 65°C. until a clear, viscous, water-soluble polyacrolein adduct forms. The reaction is cooled and stored.

B. Cross-Linking of Soluble Polyacrolein

To a suitable glass-lined reaction vessel equipped with stirrer and nitrogen gas inlet are added 2500 ml. of the polyacrolein bisulfite adduct produced above in 4000 ml. of distilled water. The solution is gently stirred and 300 grams of 1,6-hexamethylene diamine in 400 ml. of distilled water are added drop-wise over a 4 hour period. A yellow, cross-linked polymer becomes suspended and is heated to 60°C. under a heavy nitrogen blanket for 10 minutes and then cooled to room temperature. The polymer is filtered through cheese cloth, placed in a Buchner funnel and washed thoroughly with water. The cross-linked polymer is then slurried gently with 10 times its volume of water for 15–20 minutes, allowed to stand 20 minutes and filtered. The washing procedure is repeated until the pH of the washings are between 6.5 and 7.0. The solid adduct is then slurried gently for 20 minutes with 1.0M disodium phosphate adjusted to pH 6.5 and washed with distilled water.

C. Preparation of Paper Containing Bound Diaphorase

To a suitable reaction vessel is added 0.1 part of diaphorase and 80 ml. of phosphate buffer (0.1M; pH 7.2). The solution is allowed to stand in the refrigerator without agitation for 30 minutes. The enzyme is then completely dissolved by stirring. In a separate vessel are slurried 2.0 grams of the modified polyacrolein prepared above with 50 ml. of the same phosphate buffer. After stirring 10 minutes, the pH is readjusted to 7.2 with 0.1N sodium hydroxide. The contents of both vessels are then admixed and allowed to stir gently overnight at 40°C. The enzyme adduct is then filtered and washed with copious amounts of deionized water. Consistent binding yields of 75–97% are achieved using this method.

A 50/50 Albacel/Astracel pulp (concentration 2.6 g./100 cc.) is washed with water and subsequently with methanol to remove any residual sulfite and is then dried. To 10.0 parts of the resultant pulp are added 2.0 parts of the wet enzyme adduct in a suitable blending vessel. The ingredients are blended for 5 minutes, ice being added to the mixture to prevent heat build-up. The blended slurry is then processed into a paper mat about the thickness of standard filter paper and of six inch diameter on a British Hand Sheet Mold. The paper is dried in vacuo over a dessicant for 16 hours. The resultant sheet is then recovered.

The test paper prepared above, is saturated with 100 parts of an aqueous solution containing 0.7 part of polymethacrylic acid, 1.0 part of tris buffer, i.e., 2-amino-2-(hydroxymethyl)-1,3-propanediol, 20.0 parts of $d(+)$ maltose, 0.025 part of polyoxyethylene (20) cetyl ether, 0.08 part of nicotinamide-adenine dinucleotide (NAD), 0.16 part of [2-(p-iodophenyl)-3-(p-nitrophenyl)-5-phenyl-2H-tetrazolium chloride] (INT), 0.5 part of p-dimethylaminonitrosobenzene and 1.5 parts of a 60% solution of lithium lactate, all at pH 8.6. The wet paper is then dried under vacuum at room temperature in the dark.

3. Creatine Phosphokinase Test and Bibulous Carrier Therefor

A three layer composite bibulous carrier is required for this test.

Layer One:

This top layer is prepared by dipping a Metricel GA-3 membrane filter in a solution containing 120 mg. creatinine phosphate (CP) and 18.5 mg. adenine diphosphate (ADP) all in 2 ml. 0.1M tris buffer pH 7.5, followed by vacuum drying in the dark at room temperature.

Layer Two:

This middle layer is prepared by dipping Whatman No. 42 filter paper in a solution containing 54 mg. glucose, 45 mg. Triphosphopyridine Nucleotide (TPN), 2 grams d-maltose, 1.5 ml. of hexokinase suspension (HK) and 1.5 ml. of glucose-6-phosphate dehydrogenase, all dissolved in 7 ml. of a 0.1M tris buffer, pH 7.5, containing $10^{-2}$M magnesium chloride. Excess liquuid is blotted off and the paper dried as indicated for layer one under vacuum.

Layer Three:

This bottom layer was prepared by casting a film 0.03 inches thick from a solution containing 5.0% w/v methyl cellulose, 0.2% w/v 2-(p-iodophenyl)-3-(p- nitrophenyl)-5-phenyl-2H-tetrazolium chloride (INT) and 0.005% w/v phenazine methosulfate (PMS), acidified to pH 4.0. This water-soluble film was cast on a glass surface and in total darkness.

The composite CPK paper was fabricated by laying three equal squares or circles of the above three described layers one directly upon the other, with layer three on the bottom, layer two in the middle and layer one on top.

4. Serum Glutamic Oxaloacetic Transaminase Test and Bibulous Therefor

Details for the glutamic oxaloacetic transaminase test of this example, bibulous carrier materials which may be impregnated with all the necessary test reagents involved and the method for the preparation of the impregnated bibulous materials, are all set forth in U.S. Pat. application, Ser. No. 424,971, filed Dec. 14, 1973, which is incorporated herein by reference.

Briefly, the serum glutamic oxaloacetic transaminase test of this example comprises a pair of bibulous carrier materials such as cellulosic papers which contain therein the dried residue resulting from the impregnation thereof with various reagent materials. One paper of which has contained therein the dried residue resulting from the impregnation thereof with L-aspartic acid and α-ketoglutaric acid and the other paper of which has contained therein the dried residue resulting from the impregnation thereof with a diazonium salt. The following will serve to illustrate a specific embodiment thereof.

A. Preparation of Acid Bibulous Layer

A Whatman No. 3 paper strip is prewasshed with 0.01N hydrochloric acid solution, followed by rinsing with distilled water and air drying. The resultant paper is then dipped into an aqueous 0.15M phosphate buffer ($K_2HPO_4$), pH 9.0, which contains 0.05 molar L-aspartic acid, 0.01 molar α-ketoglutaric acid and 0.1% of a commerically available polyoxyethylene lauryl ether wetting agent. After standing in this solution for 5 minutes, the paper is removed. The excess liquid is drained off and the paper is then dried in a current of cool air.

B. Preparation of Diazonium Bibulous Layer

A prewashed, as above, No. 3 Whatman paper strip is dipped into an aqueous solution containing 0.3% of a diazonium salt, 2-methoxy-4-benzamido-5-methyl diazonium hydrochloride, 0.1% of the above-mentioned wetting agent and 3.0% of soluble starch. The starch was added to the water and the resultant suspension was boiled and then cooled before the diazonium component was added thereto. The final pH of the solution was then adjusted to 4–4.5 with dilute hydrochloric acid. After standing several minutes in this solution, the treated strip is removed. Excess solution is drained off and the strip dried under vacuum in the dark.

C. Binding of Component Strips

The above-prepared acid strip (A.) is precoated with a 5 mm. thick film of cellulose acetate solution comprising 10% cellulose acetate dissolved in ethyl acetate and containing 0.1% of the same wetting agent described above. The strip is air dried and a second coat of the same adhesive solution is added to the strip and, while still wet, is pressed onto the diazonium strip (B.) prepared above. The strips are placed between two flat metal plates and light pressure (~15 lbs.) is applied thereto for about 15 minutes. The resultant bonded strips are remved from the plates and placed in a stream of air (in dark) to remove the last traces of adhesive solvent.

Preparation and Use of Heart Function Test Card

A portion each of the reagent impregnated, paper prepared as in (1), (2), (3) and (4) above, is cut or punched into discs approximately one-half inch in diameter, one such disc for each spot test, for a total of four disc, that is, one disc each containing all the necessary reagents for tests (1), (2), (3) and (4) above, is appropriately mounted by means of an adhesive material on a test card composed of a cellulosic material and designated a heart function test card, taking care to leave enough space between each of the four test discs for their corresponding color control discs. On the same test card in close proximity to each of the four test discs is mounted, by means of an adhesive, three color comparator control discs for each of the four test discs, each control disc approximately one-fourth inch in diameter and appropriately colored to represent normal, elevated or low color test results specific for its corresponding test disc. Each of the four dried impregnated test discs are for the most part colorless, however, some color may be present in each.

In use, a drop of the serum to be tested is placed on each of the four reagent impregnated test discs and a color reaction or change takes place in each. A drop of serum added to test disc (1) gives a red color, test disc (2) a violet-red color, test disc (3) a red color and test disc (4) a red-brown color. The intensity of color developed on each test disc is proportional to the amount of LDH, tests (1) and (2), CPK, test (3) and SGOT, test (4), present in the serum sample. The clinician or technician then merely compares the color intensity for each test disc which results with the corresponding color comparator control discs adjacent thereto to ascertain whether the LDH, CPK and SGOT activity of the serum being tested is normal, elevated or low. In this way, an indication of the function of the heart and its present state can be obtained. If the test result is too high or too low, further tests may be indicated.

In tests (1) and (2), once the serum is added to the test indicator, the lactate dehydrogenase therein causes a reaction which results in the reduction of the tetrazolium salt and the formation of a red-colored indicator. In test (3), the creatine phosphokinase in the serum reacts with the test indicator to form a red-colored spot. In test (4), once the serum glutamic oxaloacetic transaminase is added to the test indicator, the glutamic oxaloacetic transaminase therein causes a reaction which eventually results in the coupling of the diazonium salt, i.e., the formation of a colored indicator. In test (4), the color of the indicator generally ranges from reddish-brown which is indicative of a high glutamic oxaloacetic transaminase in the test serum to brownish-yellow which indicates a normal glutamic oxaloacetic transaminase.

EXAMPLE 2

Liver Function Test Card

This example illustrates a liver function test card containing three different spot tests thereon which, in combination, are indicative of liver function, i.e., tests for serum glutamic oxaloacetic transaminase, bilirubin and alkaline phosphatase.

1. Serum Glutamic Oxaloacetic Transaminase Test and Bibulous Carrier Therefor

Details for this test, bibulous carriers which may be impregnated with all necessarry test reagents, the reagent system involved and a method for the preparation of the impregnated bilbulous carrier materials, are all forth in U.S. Patent application, Ser. No. 424,971, filed Dec. 14, 1973, which is incorporated herein by reference, and Example 1 herein.

2. Alkaline Phosphatese Test and Bibulous Carrier Therefor

Details for the alkaline phosphatase test of this example, bibulous carrier materials which may be impregnated with all necessary test reagents involved and the method for the preparation of the impregnated bibulous materials, are set forth in U.S. Patent application, Ser. No. 424,970, filed Dec. 14, 1973, which is incorporated herein by reference.

Briefly, the alkaline phosphatase test of this example comprises a pair of bibulous materials, one of which has contained therein the dried residue resulting from the impregnation thereof with a naphthyl phosphate or a monophenyl phosphate and the other of which has contained therein the dried residue resulting from the impregnation thereof with a diazonium salt. The following will serve to illustrate a specific embodiment thereof.

A. Preparation of Phosphate Bibulous Layer

A Whatman No. 3 paper strip is pretreated with 0.01N hydrochloric acid for several minutes, washed with distilled water and dried. The resultant paper strip is then saturated with an aqueous 1.0 molar solution of sodium carbonate buffer containing 1.0% α-naphthyl acid phosphate, 0.1% of a commercially available wetting agent (polyoxyethylene lauryl ether) and 0.3 micromolar magnesium chloride activator. The final pH of the solution is adjusted to 12.0 by addition of 5.0N sodium hydroxide. The papers are allowed to stand in this solution for 5 minutes and then removed. The resultant strip is drained of excess liquid and dried in a current of warm air (30°C.).

B. Preparation of Diazonium Bibulous Layer

A prewashed, as above, Whatman No. 3 paper strip is saturated with a solution containing 1.0% of a diazonium salt, 3-methoxy-4-benzamido-6-methyloxydiazonium trifluoroborate, 0.1% of the same wetting agent used above, 3.0% of urea and 3% of soluble starch. The final pH of this solution is adjusted to 4.5 with hydrochloric acid. To solubilize the starch, a suspension thereof was boiled and cooled before the other components were added. The resultant strip is allowed to stand in this solution for about 5 minutes and removed. The strip is then drained of excess liquid and dried under vacuum in the dark.

C. Binding of Component Strips

The above-prepared phosphate strip is first precoated with a 5 mm. thick layer of cellulose acetate (added as a solution containing 10% polymer dissolved in ethyl acetate containing 0.1% of the above specified wetting agent). The resultant strip is allowed to dry and a second coat of the same adhesive solution is applied. While still tacky, the strip is pressed onto the diazonium strip prepared above and the two strips are placed between two flat metal plates. Light pressure (~15 lbs.) is applied thereto for about 15 minutes. The resultant bonded strips are removed from the plates and placed in a stream of air (dark) to remove the last traces of solvent.

3. Bilirubin Test and Bibulous Carrier Therefor

A 3% starch solution is prepared by slowly adding with stirring 3 g. of soluble starch to 100 ml. of boiling water. This solution is cooled to room temperature and the following components added in the order given: 11.0 g. of maleic acid, 0.2 ml. of a 10% solution of polyoxyethylene (23) lauryl ether and 0.5 g. of p-nitrobenzene diazonium fluoborate (NBF). Test papers are prepared by dipping either Whatman No. 3 or No. 42 papers in this solution followed by drying under vacuum in the dark.

Preparation and Use of Liver Function Test Card

The dry final reagent impregnated bibulous carriers prepared in (1), (2) and (3) above are cut or punched into discs (e.g., ½ inch) and affixed to a liver function test card. One test disc each is mounted on a liver function test card composed of cellulosic material. Adjacent to each of the aforementioned test discs is mounted their corresponding color comparator control discs (three per test disc) specific for each test disc, representing normal, elevated and low color test results.

A drop of serum is added to each test disc (1), (2) and (3) which causes a reaction which results in a color change, the intensity of which is directly proportional to the concentration of the particular constituent of serum being tested. The clinician or technician then merely compares the color of each test disc with the color of the corresponding color comparator control discs to ascertain the constituent activity of the serum being tested. The results of the combination of the above tests can be used to determine liver function and status. In test (1), the color of the indicator after serum addition generally ranges from reddish-brown to brownish-yellow, in test (2) from deep red which is indicative of a high alkaline phosphates level in the test serum to pink which indicates a normal alkaline phosphates level and in test (3) various intensities of red.

I claim:

1. A diagnostic test card for the determination of organ function or status from the concentration of various biochemical and chemical constituents in blood, serum or plasma, which comprises a plurality of solid and dried diagnostic test indicators mounted on said card, each of said test indicators comprising a bibulous carrier material impregnated with the dried residue of a chromogenic liquid reagent system capable of changing color in response to the concentration of said constituents in said blood, serum or plasma, when in contact therewith, each of said test indicators, in combination, indicative of the function or status of the same organ, and at least one corresponding color comparator control mounted on said card specific for each diagnostic test indicator thereon.

2. A method for the determination of organ function or status employing the diagnostic test card according to claim 1, which comprises contacting each diagnostic test indicator on said card with blood, serum or plasma, and comparing the color of each indicator with at least one corresponding color comparator control and on said card specific for each indicator.

3. A diagnostic test card for the determination of heart function or status from the concentration of lactate dehydrogenase, glutamic oxaloacetic transaminase and creatine phosphokinase in serum which comprises four solid and dried diagnostic test indicators mounted on said card, one of said indicators comprising a bibulous carrier material containing therein the dried residue resulting from the impregnation thereof with a tetrazolium salt, a chromatographic effect preventor, an antioxidant, diaphorase and a nicotinamide-adenine-dinucleotide-alkali lactate salt mixture; one of said indicators comprising a bibulous carrier material having diaphorase covalently bound to a hydrophilic, cross-linked, sulfited aldehyde or ketone polymer dispersed throughout the interstices thereof, containing therein the dried residue resulting from the impregnation thereof with an alkali lactate salt, nicotinamide-adenine-dinucleotide and a tetrazolium salt; one of said indicators comprising a pair of bibulous carrier materials, one of said carrier materials containing therein the dried residue resulting from the impregnation thereof with L-aspartic acid and α-ketoglutaric acid, and the other of said carrier materials containing therein the dried residue resulting from the impregnation thereof with a diazonium salt; and one of said indicators comprising a pair of bibulous materials having a bottom layer, one of said carrier materials containing therein the dried residue resulting from the impregnation thereof with creatine phosphate and adenine diphosphate, the other of said carrier materrials containing therein the dried residue resulting from the impregnation thereof with glucose, triphosphopyridine nucleotide, d-maltose, hexokinase and glucose-6-phosphate dehydrogenase and bottom layer which comprises a dried film made up of methyl cellulose, 2-(p-iodophenyl)-3-(p-nitrophenyl)-5-phenyl-2H-tetrazolium chloride, and phenazine methosulfate, acidified to pH 4.0; and at least one corresponding color comparator control mounted on said card specific for each diagnostic test indicator thereon.

4. A method for the detemination of heart function or status employing the diagnostic test card according to claim 3, which comprises contacting each diagnostic test indicator on said card with serum and comparing the color of each indicator with at least one corresponding color comparator control on said card specific for each indicator.

5. A diagnostic test card for the determination of liver function or status from the concentration of glutamic oxaloacetic transaminase, alkaline phosphatase and bilirubin in serum which comprises three solid and dried diagnostic test indicators mounted on said card, one of said indicators comprising a pair of bibulous carrier materials, one of said carrier materials containing therein the dried residue resulting from the impregnation thereof with L-aspartic acid and α-keto-glutamic acid, and the other of said carrier materials containing therein the dried residue resulting from the impregnation thereof with a diazonium salt; one of said indicators comprising a pair of bibulous carrier materials, one of said carrier materials containing therein the dried residue resulting from the impregnation thereof with a napthyl phosphate or a monophenyl phosphate, and other of said carrier materials containing therein the dried residue resulting from the impregnation thereof with a diazonium salt; and one of said indicators comprising a bibulous carrier material containing therein the dried residue resulting from the impregnation thereof with aqueous starch solution, maleic acid, polyoxyethylene lauryl ether and p-nitrobenzene diazonium fluoborate; and at least one corresponding color comparator control mounted on said card specific for each diagnostic test indicator thereon.

6. A method for the determination of liver function or status employing the diagnostic test card according to claim 5, which comprises contacting each diagnostic test indicator on said card with serum and comprising the color of each indicator with at least one corresponding color comparator control on said card specific for each indicator.

* * * * *

UNITED STATES PATENT OFFICE
CERTIFICATE OF CORRECTION

PATENT NO. : 3,891,507
DATED : June 24, 1975
INVENTOR(S) : Charles Benedict Breuer It is certified that error appears in the above-identified patent and that said Letters Patent are hereby corrected as shown below:

Column 1, line 17, "Dnd" should be --Ind.--;

Column 1, line 22, "the" should be --The--;

Column 1, line 48, delete "test", first occurrence;

Column 2, line 59, insert --of-- before "blood";

Column 3, line 64, "the" should be --The--;

Column 4, line 33, after "systems" insert --which--;

Column 4, line 56, "status" should be --states--;

Column 5, line 19, "residue" should be --reside--;

Column 9, line 45, "parts" should be --grams--;

Column 10, line 5, "parts" should be --grams--;

Claim 2, line 61, delete "and";

Claim 4, line 35, delete "detemination" and insert --determination--.

Signed and Sealed this second Day of December 1975

[SEAL]

Attest:

RUTH C. MASON
Attesting Officer

C. MARSHALL DANN
Commissioner of Patents and Trademarks